VISUAL TRANSLATOR

Filed April 20, 1955 2 Sheets-Sheet 1

INVENTORS.
BURTON F. MILLER.
RICHARD A. HARTLEY.
BY Henry Heyman
ATTORNEY.

VISUAL TRANSLATOR

Filed April 20, 1955 2 Sheets-Sheet 2

Burton F. Miller,
Richard A. Hartley,
INVENTORS.
BY. Edwin A. Oser.
AGENT.

2,814,030

VISUAL TRANSLATOR

Burton F. Miller, Pacific Palisades, and Richard A. Hartley, North Hollywood, Calif., assignors to Hughes Aircraft Company, Culver City, Calif., a corporation of Delaware Application April 20, 1955, Serial No. 502,602

8 Claims. (Cl. 340—174)

The present invention relates to devices for viewing electrical waveforms and more particularly to a mechanism for visually presenting on a cathode ray tube screen a stationary image representative of information recorded on a magnetic tape.

In magnetically recording information on a magnetic tape, it is customary to move the tape past a writing head at a constant speed so that a writing current, modulated in accordance with the information to be recorded, establishes magnetic states of varying intensity on the tape as a function of time. To reproduce the original information, the magnetic tape is moved past a reading head at the same constant speed previously used in recording the information. The small signals generated by the tape moving past the reading head are then amplified and modified, if necessary, to correct for imperfections in the equipment so that the final signal is an accurate reproduction of the original signal.

Although this is quite satisfactory for ordinary purposes as a recording and reproducing system, any direct visual presentation is so fleeting that it is impossible to study any particular small section of the recording. Heretofore, to obtain a visual record so that individual waves may be studied, it has been necessary to obtain a photographic record of the signal. This can be done, for example, either by photographing the screen of a cathode ray oscilloscope tube or by means of a D'Arsonval oscillograph. Such methods are tedious and time consuming processes and present the additional problem that it is sometimes difficult to obtain an oscillogram of the desired part of the recording without also including much unnecessary material.

It is an object, therefore, of the present invention to provide a scanning device that makes it possible to visually present on a cathode ray tube screen a stationary image representative of information recorded on a magnetic tape.

It is another object of the present invention to provide a visual translator mechanism that repetitively scans selected portions of a magnetic tape upon which information is recorded.

It is a further object of the present invention to provide a visual translator mechanism that includes means for selectively presenting without delay a stationary image of information recorded on different portions of a magnetic tape.

The present invention overcomes the above and other limitations of the prior art by providing a visual translator mechanism that selectively presents for viewing on a cathode ray tube screen stationary images representing information recorded on different portions of a magnetic tape. According to the basic concept of the present invention, a short length of tape is scanned repetitively, the signal generated in response to the information magnetically recorded on the tape being applied to an oscilloscope for presentation as a stationary image on the oscilloscope screen.

More particularly, according to an embodiment of the present invention, the message tape is threaded onto and pulled taut between two reels provided on the face of a cylindrical structure which can rotate about a stationary central shaft. The cylinder is rotated at a constant speed by a motor drive so that a portion of the tape, which rotates with the cylinder, is recurrently scanned by stationary reading heads mounted in proximity to the circular path of the rotating tape. The cylinder includes suitable gearing, friction clutches, and brakes to provide for tape movement while maintaining the proper tension. In addition, the reels holds the tape immovable while it is being scanned or read and permit movement of the tape in either direction so that any portion of the tape may be selected to be scanned for presentation on the oscillograph screen.

One of the most distinctive features of the present invention is that it permits selected portions of magnetically recorded information to be uninterruptedly studied on an oscilloscope screen, as previously mentioned. An extremely important feature of the present invention is that the reading heads, of which they may be any desired number, are attached to the frame of the visual translator mechanism and are, therefore, stationary. This is important because signals generated by reading heads do not usually exceed a few millivolts. If the reading heads rotated, as suggested, for example, on pages 32 and 33 of an article entitled "High-capacity magnetic memory" by The Clevite-Brush Development Co., Clevite Corp. Research Center, 540 E. 105th Street, Cleveland 8, Ohio, in Electronic Design, January 1955, slip rings and possibly a rotating amplifier would be required to connect the moving heads to a necessarily stationary oscilloscope. This is objectionable because electrical noise introduced by slip rings and microphonic amplifiers degrade the signal and may even obscure it completely.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only, and is not intended as a definition of the limits of the invention.

Figure 1:
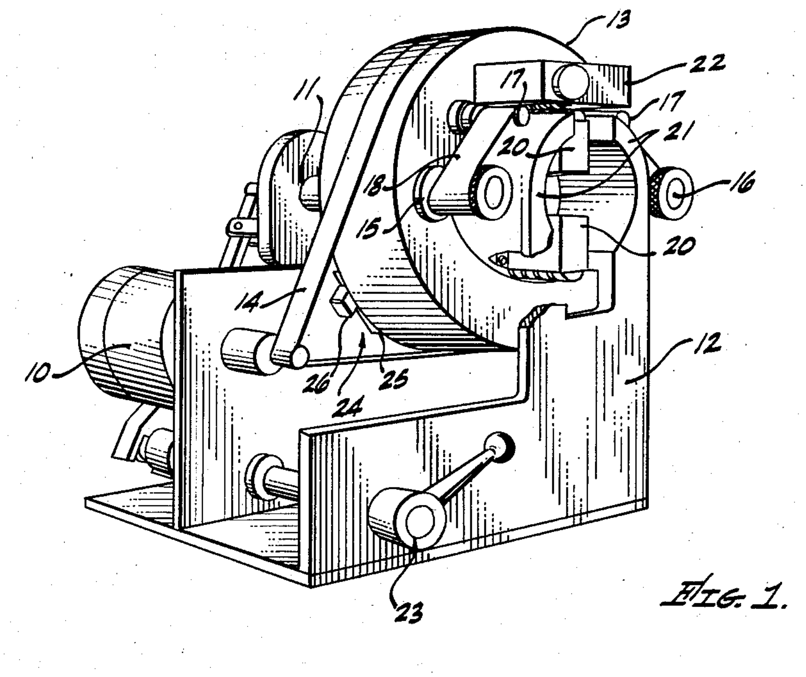
Fig. 1 is a perspective view of one embodiment of a visual translator mechanism in accordance with the present invention.

Referring now to the drawing, there is shown in Fig. 1 a visual translator mechanism, according to the present invention, that makes it possible to present, on an oscilloscope screen, stationary images or waveforms representative of information recorded on a magnetic tape. As shown therein, the translator mechanism comprises a motor 10 and a stationary central shaft 11 mounted on a frame 12, the motor being utilized to drive a partially hollow cylinder 13 rotatably mounted on the shaft. Cylinder 13 is coupled to motor 10 by means of a belt 14 and is rotated by the motor-belt drive at a constant speed.

A positioning reel 15, a torque reel 16 and a pair of rollers 17 are affixed to one face of cylinder 13, the reels and rollers being positioned relative to each other so as to form a trapezoidal configuration, as shown in Fig. 1. A magnetic tape 18, upon which information is recorded, is wound on reels 15 and 16 and pulled taut over rollers 17. Thus, reels 15, 16 and rollers 17 rotate with cylinder 13, magnetic tape 18 being moved at a constant speed in a circular path around central shaft 11.

A plurality of stationary reading heads 20 are positioned adjacent to magnetic tape 18 for the purpose of scanning selected portions of the tape, the heads being held rigidly in position by attachment to a stationary shield cylinder 21 integral with frame 12 and extending from the frame into the hollow portion of cylinder 13. More particularly, two reading heads 20 are illustrated, by way of example, in Fig. 1 which are disposed along the circumference of a circle concentric with the circular path of the tape and adjacent thereto, the heads being equally spaced to provide periodic scanning of a portion of magnetic tape 18 exposed between rollers 17.

It should be mentioned that positioning reel 15 serves two functions, namely, to hold the tape immovable while it is being scanned or read and to move the tape in either direction so that any portion of the tape may be selected to be scanned for presentation on an oscilloscope screen. On the other hand, the function of torque reel 16 is to keep tape 18 under tension at all times and, together with a pressure pad 22 mounted on cylinder 13 immediately above rollers 17, to hold the tape firmly against the reading heads.

For the performance of these functions, reels 15 and 16 are under the control of a lever control mechanism 23 which is mounted on frame 12 and mechanically coupled to the reels. Furthermore, by a suitable arrangement of gears, brakes and clutches, shown in Fig. 3 and described later, lever control mechanism 23 controls the action of the reels by movement of the lever to any one of three positions, namely, a center position wherein positioning reel 15 is held stationary, and left and right positions wherein the positioning reel is rotated clockwise and counterclockwise, respectively. Thus, magnetic tape 18 may be moved forward or backward so that any portion of the tape may be scanned.

A magnetic pulse generator, generally designated 24, is mechanically coupled between rotating cylinder 13 and frame 12 for generating electrical pulses in response to the rotation of cylinder 13 to synchronize the oscilloscope sweep circuit to the rotating cylinder. More particularly, magnetic pulse generator 24 comprises one or more equally spaced magnets 25 fixed to cylinder 13 and a pulse coil 26 fixed to stationary frame 12, the number of magnets being equal to the number of reading heads 20. Pulse coil 26 is electromagnetically coupled to each magnet as it rotates with the cylinder past the coil and, during each such moment of coupling, an electrical pulse is induced in the coil. Accordingly, the number of pulses induced in pulse coil 26 during a unit period of time is equal to the number of times a selected portion of tape 18 is scanned by reading heads 20 during the same interval, the induced pulses and the signals generated by the reading heads being synchronized in time.

Figure 2:
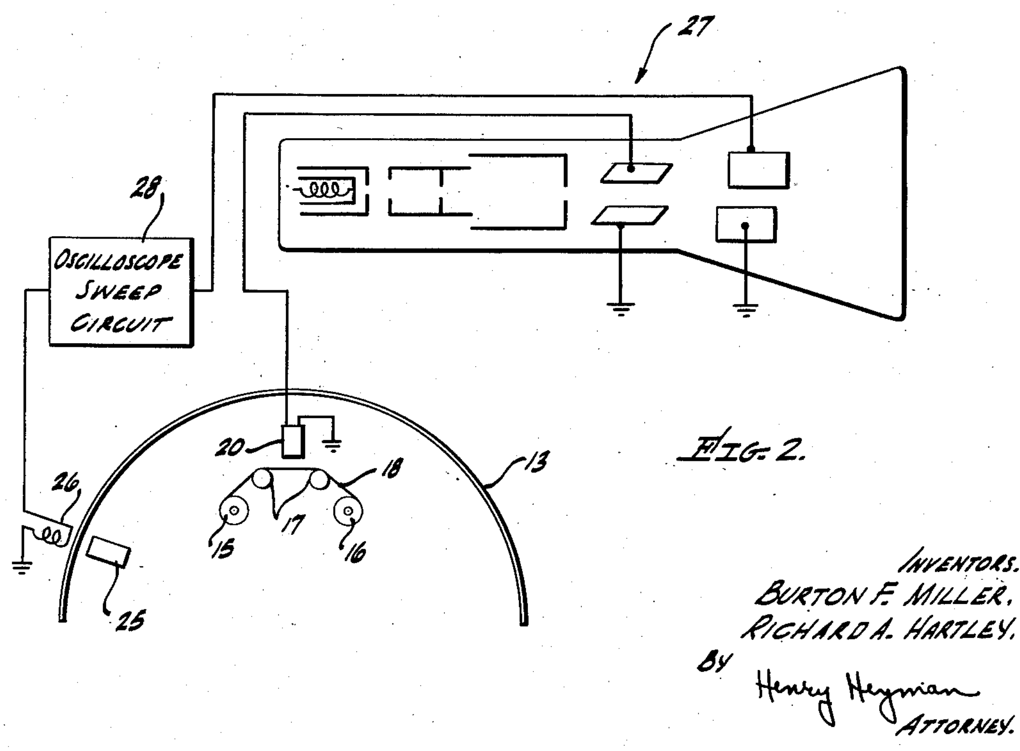
Fig. 2 is a schematic diagram of the visual translator mechanism of Fig. 1 in cooperation with an oscilloscope for projecting images, representative of recorded information, on the oscilloscope screen.

Referring to Fig. 2, there is shown a schematic drawing of a visual translator mechanism coupled to an oscilloscope represented by cathode ray tube 27 and sweep circuits 28. As illustrated therein, stationary reading head 20 is electrically connected to the horizontal deflection plates of tube 27 and pulse coil 26 is electrically connected between ground and sweep circuits 28 which control the horizontal sweep by means of vertical deflection plates of tube 27. As previously described, a magnet 25, reels 15 and 16, rollers 17 and magnetic tape 18 are shown mounted on rotating cylinder 13.

Figure 3:
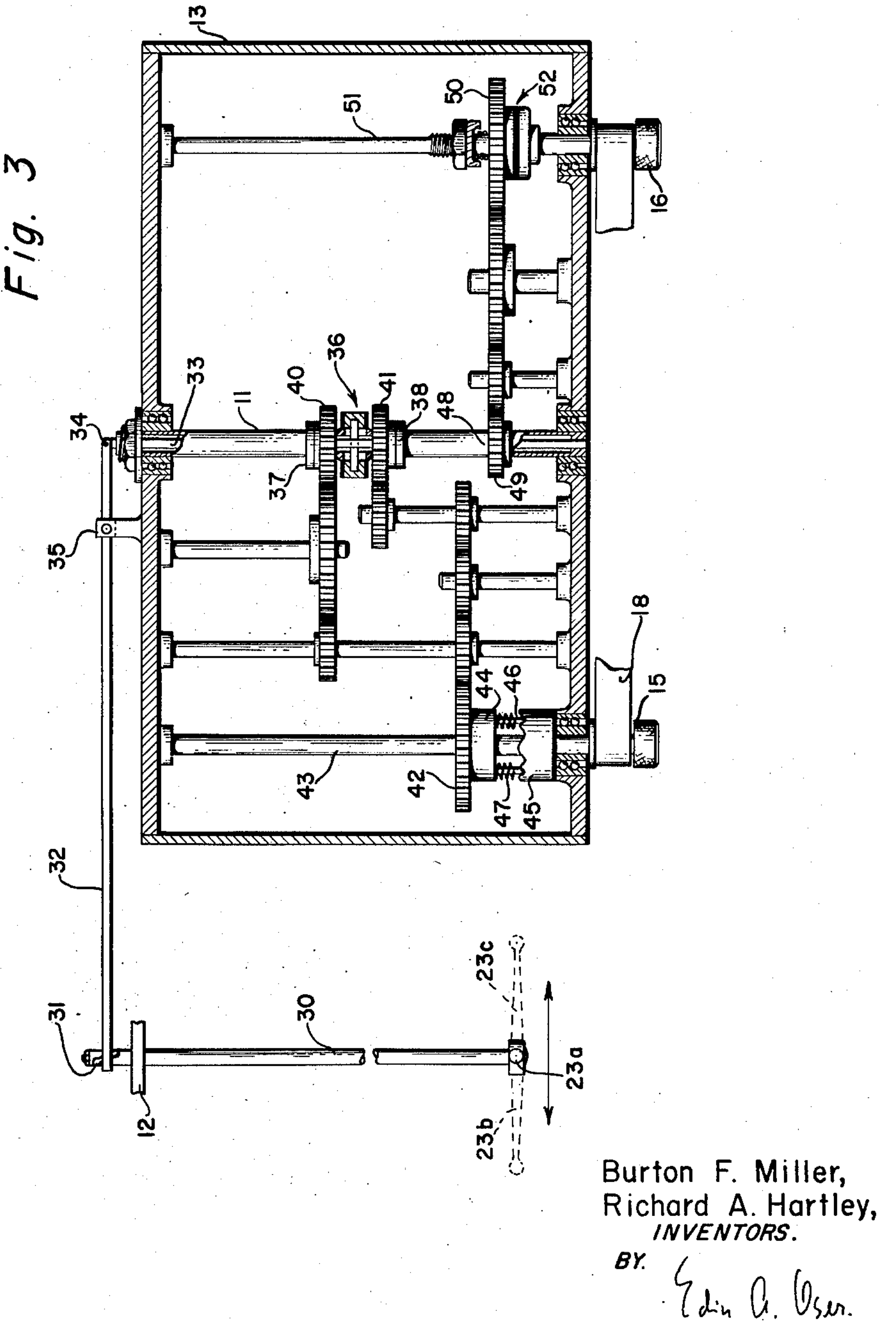
Fig. 3 is a cross-sectional view showing the mechanical linkage between the control mechanism and reels of the translator of Fig. 1.

Referring now to Fig. 3, there is shown the mechanical linkage between lever control mechanism 23 and positioning and torque reels 15 and 16, respectively. As shown in the figure, mechanism 23 is fixedly mounted on one end of a shaft 30 which is rotatably mounted on frame 12, the other end of shaft 30 having a cam groove 31 into which one end of a lever 32 has been movably mounted. The other end of lever 32 is mechanically coupled to a slidable shaft 33 by means of a pin 34 about which the lever can rotate and, intermediate its ends, lever 32 is rotatably mounted on a fulcrum 35.

Shaft 33 is slidably mounted within the hollow of stationary central shaft 11, as shown in the figure, and, intermediate its ends, is mechanically coupled by means of a cross-bar to a collar slidably mounted on a spline which is mounted on the shaft. The assembly of cross-bar, collar and spline is generally designated 36. The top and bottom faces of the collar in assembly 36 are covered with a layer of frictional material so that either surface has braking power when brought into contact with another surface.

On either side of assembly 36 is mounted a collar which is rigidly fixed to shaft 11, the collar on one side being designated 37 and the collar on the other side being designated 38. Between assembly 36 and collars 37 and 38 are a pair of gears 40 and 41, respectively, rotatably mounted on shaft 11 and these two gears are coupled through a plurality of intermediate gears to a final gear 42, as shown in the figure. Gear 42 is fixedly mounted on a shaft 43 that is rotatably mounted on one wall of cylinder 13. Hence, although rigidly mounted on shaft 43, gear 42 is also rotatable. Similarly, the intermediate gears coupling gears 40 and 42 are also fixedly mounted on rotatably mounted shafts and, therefore, are also rotatable.

Gear 42 is coupled by means of a spring loaded member 44 to a serrated member 45 which is fixedly mounted on the rotatable shaft of positioning reel 15. On the bottom face of member 45 is a layer of frictional material which brakes member 45 to cylinder 13 and, therefore, tends to prevent the rotation of positioning reel 15. More particularly, spring loaded member 44 includes two or more pins 46 which protrude from the body portion of member 44 and which fit into the serrations of serrated member 45. A spring 47 wound around each pin 46 causes the pins to maintain the desired amount of pressure against serrated member 45. This pressure is adjusted so as to limit the tension to which tape 18 (see Fig. 1) may be subjected due to the rotation of reels 15 and 16 and in that way ensure that the tape won't break. Whenever the tension on the tape becomes too great, pins 46 merely slip from one serration into the next, as will be obvious to one skilled in the mechanical arts.

Mounted on shaft 11 is still another gear 49 which is rigidly held in place on the shaft by means of a key 48. Gear 47 is coupled by means of several intermediate gears to a final gear 50 which is fixedly mounted on a shaft 51 rotatably mounted on one wall of cylinder 13. Hence, although fixedly mounted, gear 50 is also rotatable. Gear 50 is coupled through a slip clutch, generally designated 52, to the rotatably mounted shaft of torque reel 16. It will be obvious that when cylinder 13 is rotated by motor 10 and belt 14 about central shaft 11 (see Fig. 1), the intermediate gears and gear 50 are also caused to rotate about their respective shafts. Consequently, when cylinder 13 is in rotation, a torque is applied at all times to torque reel 16 and, if it is assumed that cylinder 13 rotates in a clockwise direction, the torque applied to reel 16 is also in a clockwise direction. Hence, torque reel 16 tends to at all times rotate in a clockwise direction and, thereby, picks up any slack that may exist in tape 18. By proper adjustment of slip clutch 52, the tension which is at all times applied to tape 18 can be maintained substantially constant and limited to prevent breakage of the tape. Considering the operation of the linkage shown in Fig. 3, when control arm or mechanism 23 is in a neutral position, as shown by arm 23*a* in Fig. 3, the collar of assembly 36 is detached from gears 40 and 41 as shown in the figure. Consequently, gears 40, 41, 42 and the intermediate gears all rotate with cylinder 13 about shaft 11. Thus, there is no relative motion between these gears and positioning reel 15 is held firmly in position by the braking action of serrated member 45. As a result, there is no movement of tape 18.

When control arm 23 is moved to the left as at 23*b*, shaft 30 is rotated in a counterclockwise direction, thereby forcing one end of lever 32 to ride downwardly in cam groove 31. As a result, the other end of lever 32 is forced to move upwardly, thereby moving the collar of assembly 36 upwardly into firm contact with gear 40. Accordingly, gear 40 is locked in place on stationary shaft 11 due to the braking action of the friction material on the upper face of the collar. It will be recognized, therefore, that there is now relative motion between gear 40, gear 42 and the intermediate gears therebetween so that gear 42 is forced to rotate in a clockwise direction. The rotation of gear 42 causes a clockwise torque to be applied to serrated member 45 which then slips or moves relative to the wall of cylinder 13, thereby causing positioning reel 15 to rotate in a clockwise direction. The rotation of reel 15 in turn causes tape 18 to move toward the right, that is, toward torque reel 16, the latter picking up the slack and tightening up the tape, as mentioned previously.

When control arm 23 is moved to the right from a neutral position, as at 23*c*, shaft 30 is rotated in a clockwise direction and, as a result, the one end of lever 32 is moved upwardly in cam groove 31. Thus movement of lever 32 forces the other end of the lever downwardly and, in turn, forces the collar of assembly into firm contact with gear 41. Consequently, gear 41 is braked and, therefore, forced to remain stationary relative to shaft 11 as cylinder 13 revolves. Following the same reasoning as before, it will be seen that under these conditions gear 42 is caused to rotate in a counterclockwise direction, thereby forcing tape 18 to move toward the left, that is, away from torque reel 16 which helps keep the tape taut.

Considering now the operation of the entire visual translator as shown in Fig. 1, magnetic tape 18, upon which the information to be studied is recorded, is threaded between rollers 17 and pressure pad 22. The ends of the tape are then attached to reels 15 and 16 which are manually turned in the appropriate directions to pull the tape taut and to expose the portion of the tape selected for study between rollers 17.

After motor 10 is started, cylinder 13 rotates at a constant speed and the selected portion of tape 18 between rollers 17 is successively passed over reading heads 20. In other words, the selected portion of tape 18 is periodically scanned. As a result, electrical signals representing the information recorded on the scanned portion of tape are periodically generated by the reading heads and applied to the horizontal deflection plates of cathode ray tube 27. In addition, as cylinder 13 rotates, trigger pulses are periodically induced in pulse coil 26 by magnets 25, the frequency or repetition rate at which the trigger pulses are generated being equal to the frequency at which the information signals are generated. These trigger pulses are applied to sweep circuit 28 which controls the horizontal voltage sweep between the vertical deflection plates of tube 27 and, therefore, the horizontal position of the information signals projected on the screen of the tube. As long as the time relationship between the trigger pulses and the information signals remains the same, the signals are presented as a stationary image or waveform on the screen.

The image is presented as a series of flashes with the presentation rate being determined by the speed of rotation of cylinder 13 and the number of reading heads utilized. It has been found that a repetition rate of four flashes per second is satisfactory if a long persistence screen is used. Such a repetition rate may be obtained, for example, with two reading heads and a cylinder speed of two revolutions per second.

If the tape is displaced in time relative to the magnets, that is, if the information signals generated in the reading heads are moved in time relative to the trigger signals generated in the pulse coil, the presentation on the oscilloscope screen is likewise moved. Thus, by moving the tape forward or backward, any portion of the tape may be scanned. Movement of the tape may be accomplished by operating the control lever in the manner previously described to roll the tape from one reel to the other.

What is claimed as new is:

1. A mechanism for visually presenting stationary images on an oscilloscope screen representative of information recorded on a magnetic tape, said mechanism comprising: a stationary shaft; a cylinder rotatably mounted on said shaft and including reels for mounting the magnetic tape; means for rotating said cylinder at a constant speed to uniformly move the tape in a circular path; and at least one stationary reading head electrically connected to the oscilloscope and contiguous to said circular path for repetitively scanning a predetermined portion of the magnetic tape, the information recorded on said scanned portion of the tape being presented as a stationary image on the oscilloscope screen.

2. The mechanism defined in claim 1 which further includes additional means for generating electrical pulses in response to the rotation of said cylinder to synchronize the sweep circuits of the oscilloscope to the rate of rotation of said cylinder.

3. The mechanism defined in claim 2 wherein said additional means comprises a magnetic pulse generator having a pulse coil positioned contiguous to said cylinder, and at least one magnet attached to said cylinder, said magnet inducing an electrical pulse in said coil during each revolution of said cylinder.

4. The mechanism defined in claim 1 which further includes a control lever mechanically coupled to said reels and manually operable for controlling the rotation of said reels in either direction, whereby rotation of said reels causes a corresponding movement of the magnetic tape for selection of different portions of the magnetic tape for scanning.

5. A visual translator mechanism for selectively generating electrical signals representing information recorded on a magnetic tape, said electrical signals being presented for viewing as stationary images on an oscilloscope screen, said mechanism comprising: a stationary shaft; a cylinder rotatably mounted on said shaft and including reels for mounting the magnetic tape; a motor-drive for rotating said cylinder at a constant speed to uniformly move the tape in a circular path; a magnetic pulse generator coupled to said cylinder for periodically generating an electrical pulse to synchronize the oscilloscope-sweep circuit with respect to said rotating cylinder; at least one stationary reading head contiguous to said circular path for repetitively scanning a predetermined portion of the magnetic tape, the information recorded on said scanned portion being presented as a stationary image on the oscilloscope screen; and a manually operable control lever mechanically coupled to said reels for selecting portions of the magnetic tape to be scanned.

6. The visual translator mechanism defined in claim 5 wherein said magnetic pulse generator comprises a pulse coil positioned contiguous to said cylinder, and at least one magnet attached to said cylinder, each magnet inducing an electrical pulse in said coil during each revolution of said cylinder.

7. A visual translator mechanism for selectively generating electrical signals representing information recorded on a magnetic tape, said electrical signals being presented for viewing as stationary waveforms on an oscilloscope screen, said mechanism comprising: a cylinder having reels affixed thereon for mounting the magnetic tape, said reels being movable in a circular path upon rotation of said cylinder; a motor-drive for rotating said cylinder at a constant speed; a plurality of stationary reading heads equally spaced along the circumference of a circle concentric with said circular path and adjacent thereto for periodically scanning a selected portion of the magnetic tape, said reading heads being connected to periodically apply to the oscilloscope electrical signals representng the information recorded on said selected portion of tape; a stationary pick-up coil positioned contiguous to said cylinder; and a plurality of equally spaced magnets, corresponding in number to the number of said reading heads, mounted on said cylinder for periodically inducing in said pick-up coil an electrical trigger pulse synchronized in time with said electrical signals, each trigger pulse being applied to the oscilloscope to control the horizontal sweep of the oscilloscope, whereby said electrical signals are presented as stationary waveforms on the oscilloscope screen.

8. A system for viewing stationary waveforms of electrical signals representing information recorded on a magnetic tape, said system comprising: a cylinder having reels affixed thereon for mounting the magnetic tape, said reels being movable in a circular path upon rotation of said cylinder; a motor-drive for rotating said cylinder at a constant speed; a plurality of stationary reading heads equally spaced along the circumference of a circle concentric with said circular path and adjacent thereto for periodically scanning a selected portion of the magnetic tape, said reading heads periodically generating electrical signals representing the information recorded on said scanned portion of tape; a pulse generator for periodically generating electrical trigger pulses synchronized in time with said electrical signals; and an oscilloscope electrically coupled to said reading heads and said pulse generator, said oscilloscope being responsive to said trigger pulse and electrical signals for presenting on the oscilloscope screen a stationary waveform of said electrical signals.

References Cited in the file of this patent

UNITED STATES PATENTS

| | | |
|---|---|---|
| 2,519,725 | White | Aug. 22, 1950 |
| 2,528,699 | Masterson | Nov. 7, 1950 |
| 2,737,646 | Muffly | Mar. 6, 1956 |

FOREIGN PATENTS

| | | |
|---|---|---|
| 688,816 | Great Britain | Mar. 11, 1953 |
| 112,255 | U. S. S. R. | July 8, 1932 |